United States Patent [19]
Colens

[11] Patent Number: 5,444,965
[45] Date of Patent: Aug. 29, 1995

[54] CONTINUOUS AND AUTONOMOUS MOWING SYSTEM

[76] Inventor: André Colens, 39 avenue Louis Lepoutre, B-1060 Bruxelles, Belgium

[21] Appl. No.: 50,371

[22] PCT Filed: Sep. 23, 1991

[86] PCT No.: PCT/BE91/00068
§ 371 Date: Mar. 23, 1993
§ 102(e) Date: Mar. 23, 1993

[87] PCT Pub. No.: WO92/04817
PCT Pub. Date: Apr. 2, 1992

[30] Foreign Application Priority Data

Sep. 24, 1990 [BE] Belgium ................. 9000906
Jun. 4, 1991 [BE] Belgium ................. 9100537

[51] Int. Cl.6 ........................... A01D 34/82
[52] U.S. Cl. ................. 56/10.2 A; 56/10.2 J; 56/11.9
[58] Field of Search .......... 56/10.2 A, 10.2 J, 11.9, 56/16.7, DIG. 15

[56] References Cited

U.S. PATENT DOCUMENTS 3,550,714 12/1970 Bellinger ............... 56/10.2 A X
3,924,389 12/1975 Kita ....................... 56/10.2 A
4,777,785 10/1988 Rafaels ................... 56/10.2 A
4,919,224 4/1990 Shyu et al. ............ 56/DIG. 15 X Primary Examiner—Terry Lee Melius
Attorney, Agent, or Firm—Leonard Bloom

[57] ABSTRACT

The invention relates to an automatic, self-contained machine for continuously mowing grass. The machine is powered by means of photovoltaic cells (10) and can be wheeled (15) or tracked. A device comprising a microcomputer programmed by an algorithm allows to search for spots where the grass must be cut and to detect the boundaries of the surface to be mown. The obstacles (92) are detected and passed around by analysis of relative movements of an upper panel (9) comprising the photovoltaic cells (10) and a lower frame (1).

20 Claims, 12 Drawing Sheets

CONTINUOUS AND AUTONOMOUS MOWING SYSTEM

The present invention relates to an entirely autonomous and automatic device for continuous maintenance of lawns.

The expression 'autonomous and automatic' signifies that the device requires no human intervention for the whole or part of the mowing period and takes decisions concerning the evaluation of obstacles, skirting them, searching for zones to be mowed, its running order and the evaluation of the limits of the mowing zones.

Advantageously the device requires no refuelling from an energy source.

By 'continuous maintenance of lawns' is understood that the device is constantly activable during the mowing period in function of certain parameters which, among others, allow the problem of collecting the cut grass to be eliminated.

It is known that lawn mowers have undergone a long evolution. Self-propelled models, at present widespread, have considerably reduced the work of the user. Human presence is nevertheless required. Tests have also been conducted to partially or totally automatize the mowing work but have not given complete satisfaction until now.

Thus the U.S. Pat. No. 4,777,785 describes a robot mower model which detects the cut and uncut parts of the lawns, allows the robot to follow the limits of the grass already cut and automatically to mow the remaining surface. The system is nevertheless not entirely automatic. It requires positioning of the machine at each mowing and the manual skirting of obstacles.

The French patent 2 631 466 divulges the application of an entirely automatic system but which necessitates significant work beforehand such as positioning of a series of special function cables.

Most other similar systems which have been offered by the former state of the art necessitate either human intervention (see e.g. U.S. Pat. Nos. 3,425,197, 3,924,389, 4,133,404, 4,545,453), namely the placing of buried cables, (U.S. Pat. Nos. 3,550,714, 3,570,227). These devices are moreover heavy, onerous and are not autonomous in respect to their energy supply.

Finally preprogrammed devices are known which follow a predetermined route on the lawn. These can nevertheless accidentally deviate from the preassigned course and furthermore cause damage. They also necessitate manual positioning of the machine at each start of mowing.

All the preceding systems call for a punctual mowing technique—the mower operating intensely for a predetermined period—separated by periods during which the mower is put away.

The purpose of the present invention is to provide an automatic and autonomous device which does not show the aforesaid disadvantages—notably manual intervention, heavy infrastructure, risks of accidents, positioning and putting away the mower—and eliminates the necessity of collecting the cut grass because of its continuous operation, In relation to former systems, the mowing device according to the present invention shows a significant reduction of weight, allows the utilization of a low powered motor thus promoting safety in utilization, and operates silently.

It has in fact been determined that, in surprising manner, such device can be devised based solely on a source of energy of very low power, less than 100 W. According to the preferred embodiment of the invention, the power is from photovoltaic cells, the only source of energy utilized being solar energy. The low power of the device can be compensated by the fact that the mowing takes place in almost permanent manner for the whole or part of the mowing period, the lawn being thus in fact kept mowed.

The invention therefore offers an autonomous lawn mower, with electric motor(s), comprising at least one driving wheel and an electronic operating and control system characterized in that the total power utilized by the aforesaid motor or motors is less than 100 Watts and in that the route is determined by responses to obstacles at the limits of the surface to be mowed and the local condition of the aforesaid surface, responses dependent upon an algorithm stored and processed by a microprocessor, the mower being continuously 'activable' and activated in function of the state of charge of a rechargeable battery and/or the sunshine and/or the degree of humidity of the lawn.

In the scope of the invention is understood by 'mowing' both the mowing of a lawn of which the grass is of height such that a mowing operation is desirable and mowing consisting simply of keeping a lawn mowed. The invention by its nature and its means is nevertheless more adapted to maintenance of a lawn in mowed condition. An initial mowing operation of a lawn of which the grass could already be too high could hinder the normal operation of the device according to the invention, device of which the power is by nature limited. A mower is therefore a means adapted to mowing as defined above.

The device as described below is more particularly adapted to mowing a lawn surface. In the scope of the present invention, the mower may nevertheless be utilized for the processing of all other vegetable surfaces capable of being maintained by a continuous or periodic cut at a determined height, generally less than 80 cm, preferably less than 20 cm. In particular the device according to the invention can be adapted to continuous undergrowth clearance of a surface. The term lawn therefore includes numerous vegetables apart from grass.

The term 'wheel' in the scope of the present invention also includes tracks or all other equivalent means of advancing.

By 'continuously activable' is understood that the device is capable of responding to an environmental parameter or to a state of charge of a battery, thus provoking it to start without intervention of the user. According to a preferred mode of the invention, the electronic circuit and the microprocessor operate continuously even when the device is in a state of rest, of recharging or waiting.

According to a preferred mode, the mower comprises in fact one rechargeable battery which can be powered by photovoltaic cells.

According to a variant of the embodiment, the rechargeable battery can be powered by a power source present on or near the surface to be mowed, the mower automatically moving there according to a determined algorithm depending among others upon the state of charge of the aforesaid battery.

According to one aspect of the invention the mower is characterized in that the total power lies between 10 and 120 W preferably 15 to 60 W.

According to another aspect of the invention, the mower is characterized in that the capacity of the rechargeable battery is less than 5 A/h, preferably less than 2 A/h.

According to yet another aspect of the invention, the mower is characterized in that it interrupts all movement and all mowing operation widen the state of charge of the battery or the sunshine is less than a reference value, the device being either in a state of waiting or in a state of recharge.

According to yet another aspect of the invention, the mower is characterized in that the route is determined notably by the measure of force produced by the cutting system.

According to yet another aspect of the invention, the mower is characterized in that an independent motor is connected to each driving wheel.

According to yet another aspect of the invention, the mower is characterized in that a charge detector is connected to each driving wheel.

According to yet another aspect of the invention, the mower is characterized in that it detects the limits of the zone to be mowed fixed by one or more cables supplied with a low current by means of a field detector at the front of the aforesaid chassis.

According to yet another aspect of the invention, the mower is characterized in that the obstacles are detected and skirted by analysis of relative movements of an upper plate, possibly comprising photovoltaic cells, and a lower chassis.

In this connection a shock analysis system can advantageously be provided which allows differentiation between a shock resulting from the presence of an obstacle from that resulting from the irregularity of the surface (hole or hump) which does not necessitate skirting. The algorithm applied by the microprocessor can in fact not take into account possible oscillations caused by a shock due to an irregularity, for example owing to a numeric screening in itself known.

According to yet another aspect of the invention, the mower is characterized in that the weight of the rechargeable battery is less than 5 kgs, preferably less than 1 kg.

The invention also relates to a method for mowing a lawn characterized in that a device as described above is positioned and left in autonomous manner for at least several days.

The method is more particularly adapted for keeping a lawn mowed, the device being positioned and left in autonomous manner for at least several days, possibly several weeks or for the mowing period which lasts several months.

The present invention more particularly offers a mowing device for lawns which shows the following elements, separately or combined:

- a low consumption cutting system, which allows direct supply of the device from a photovoltaic source;
- supply by photovoltaic cells;
- an electronic control system
- detection of the grass surfaces to be cut by measuring the force produced by the cutting system
- searching for the grass surfaces to be cut by the interaction of the advancing system of the device, of the aforesaid detection device and of the microcomputer;
- detection of obstacles by the analysis of relative movements of the upper plate of the device and of its chassis
- detection of the limits of the surface to be mowed by the analysis of spacing between two obstacles.

The limit of the mowing surface not fixed by natural obstacles (plants, netting, low wall, border) is determined either by contact studs placed on the ground at specific maximum intervals or by a laid down or buried cable.

- a security system based on the utilization of a charge detector on each wheel.
- an anti-theft device based on the measurement of the distance to the ground and/or on a code belonging to the user.

According to a particularly original characteristic of the invention, the device is placed on the surface to be mowed at the start of the season and its operation takes place as soon as the ambient luminous energy exceeds a certain threshold.

The device can and will therefore preferably be left on the surface to be mowed for at least several days and can be left in autonomous manner for several months and even for the whole mowing season.

According to a particular mode of the embodiment, in operating condition, the device continuously moves on the surface to be mowed causing the cutting head to describe a movement of oscillations to the right and to the left of the axis of advancement.

The oscillating movement of the head of the device allows the detection of the distance between two obstacles. If the device for example detects an obstacle to its left, it will drive its head to the right and if an obstacle is then detected on the right at a smaller distance to a fixed and programmed distance, the computer then considers that it has reached the limits of the surface to be mowed and turns back.

Moreover, according to another preferred characteristic of the invention, when the device reaches an already mowed zone, the load on the cutting head decreases, phenomenon detected by a control computer which transmits more power to the driving wheels until an unmowed zone is encountered.

The algorithm of the control computer allows the efficiency of this search to be optimized and the mowing work to be organized. Preferably the computer will be provided with a clock which the operating algorithm will interrogate.

According to a particular mode of the embodiment of the invention, when an obstacle is encountered, the upper plate of the device comprising photovoltaic cells comes into contact with the obstacle. The upper plate being attached in supple manner to the lower plate, it moves in relation to the latter. A movement detector detects the relative movement and, from that, the position of the obstacle compared to the device. The information is transmitted to the computer which controls the driving wheels to disengage itself, skirt the obstacle or turn back.

The device according to the invention preferably comprises a rechargeable battery which on the one hand intervenes for mowing shaded zones, and on the other hand for evening out the photovoltaic power supply and ensuring moreover continuous supply to the operating system and the electronic control, which allows the device to be continuously activable in function of certain parameters such as the state of charge of the battery, the environment and the sunshine.

Means can furthermore be provided for detecting shaded zones and adapting the organization of mowing in consequence, taking into account the various parameters such as the level of charge of the battery, the time, the height of the grass etc.

According to a preferred mode of the invention, the device comprises a chassis on which two independent driving wheels or tracks are advantageously mounted each driven by an electric motor. The differential control of the speed of each wheel allows the device to be directed. The device comprises one or two free wheels in front, the wheels thus form a triangle or a trapezium and support the chassis. A cutting head forming one piece with the chassis comprises a low voltage electric motor of low power and a cutting disc of small diameter and of high efficiency.

A plate supporting photovoltaic cells is mounted in supple manner on the chassis.

The device also comprises an electronic box comprising:
a control computer
a photovoltaic cell plate movement sensor
power circuits notably controlling:
the cutting head
the two driving wheels
a possible audible signal
the regulation of the current coming from the photovoltaic cells
the measuring circuit of the energy absorbed by the cutting device.

Three charge detectors (or one per wheel) will preferably be provided connected to the electronic box.

The device according to the invention therefore shows a very light structure, e.g. of 4 kgs compared to 40 kgs for a battery-operated automatic mower, connected to a high efficiency cutting unit and to a data processing program which enables the search for zones to be mowed, the search and the skirting of shaded zones, the detection of obstacles, the detection of the limits of the plot of land to be mowed, the detection and the negotiation of ground irregularities (slope, humps) and the detection of the degree of humidity of the lawn.

The device according to the invention can thus maintain a mowed lawn of a surface area of 1000 m² at a latitude corresponding to that of Belgium, with an average consumption, in operation, of 25 Watts.

The invention will be more fully described on the basis of FIGS. 1 to 14 attached hereto, shown by way of nonrestrictive examples of the embodiment.

Figure 1:
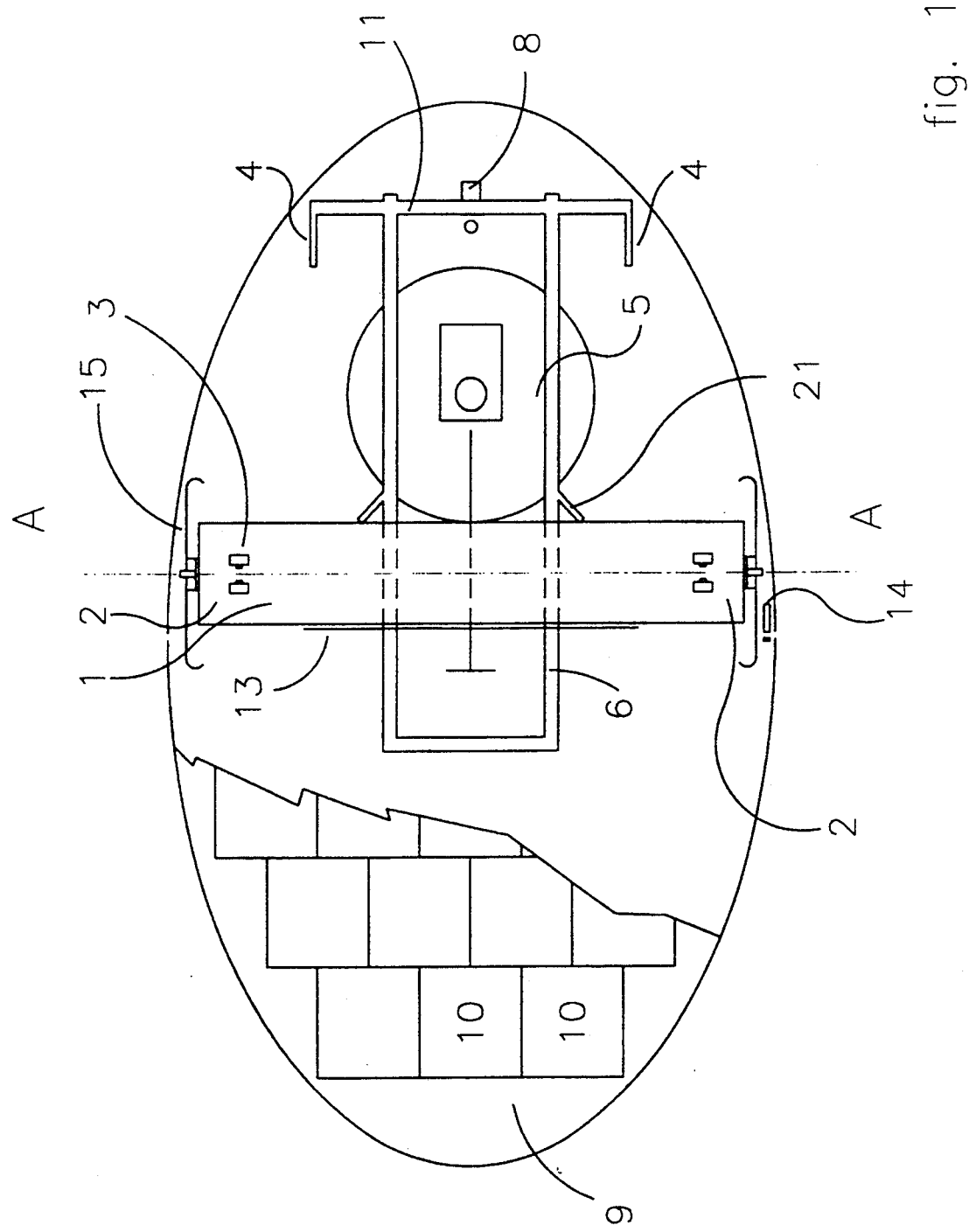
FIG. 1 represents a partially exploded top view of an embodiment of the device according to the invention showing an oval profile.
Figure 2:
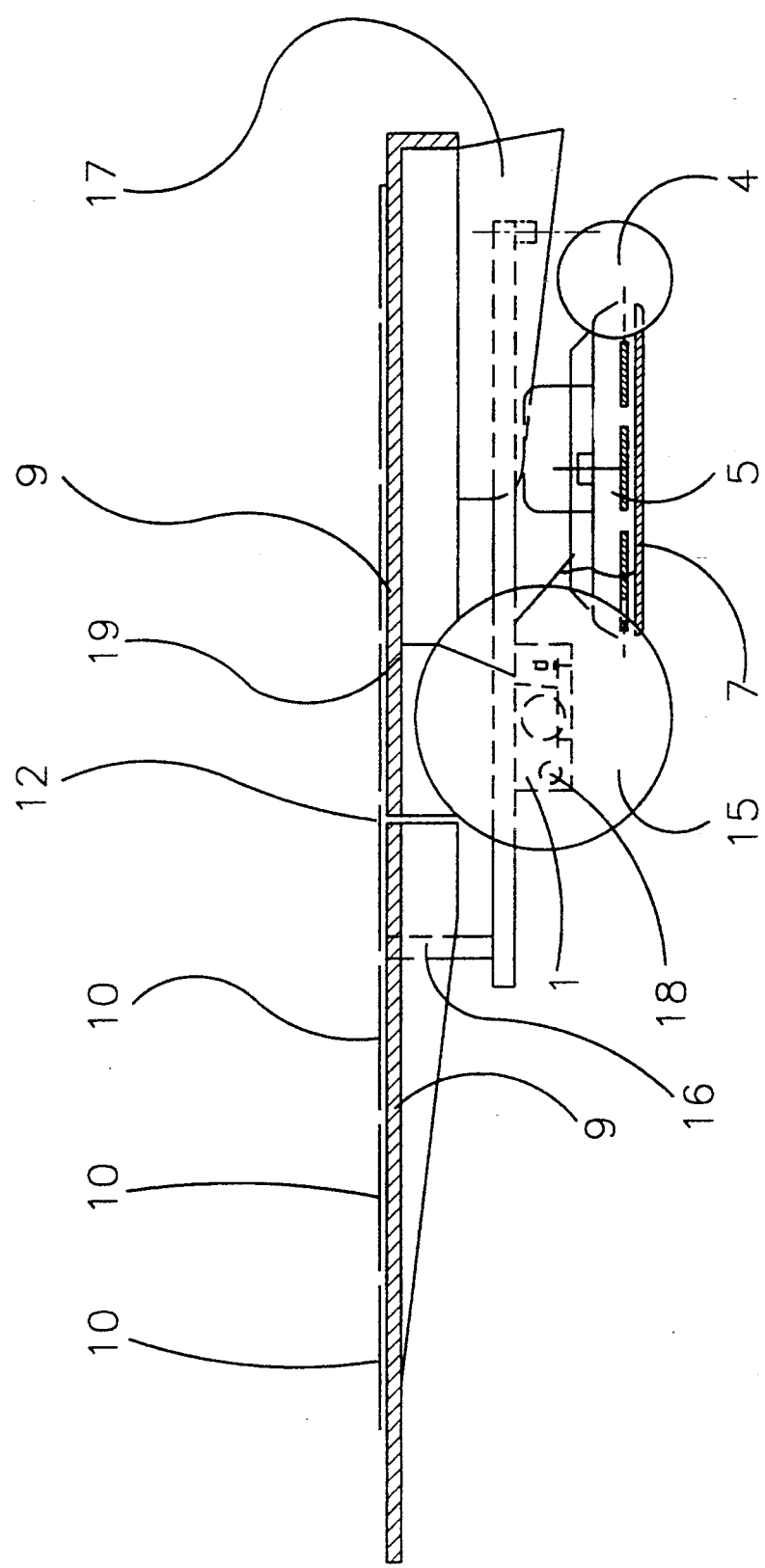
FIG. 2 represents a cross-section of the device according to FIG. 1.
Figure 3A:
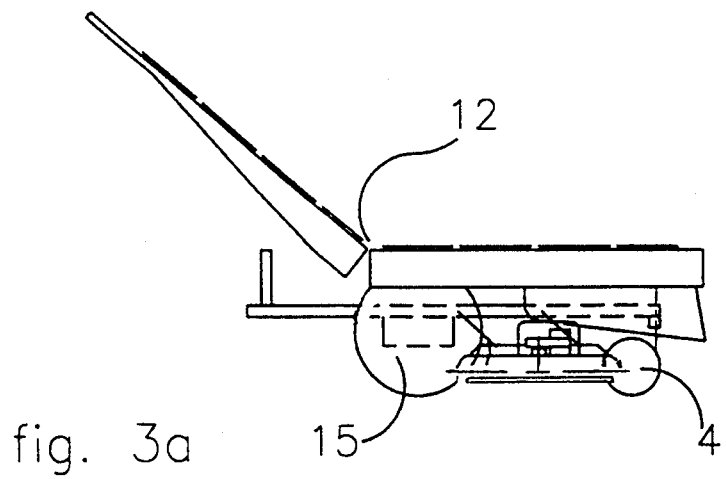
FIGS. 3a, 3b, 3c represent side views of the device showing its rear part respectively partially lowered, in position of climbing an elevation, and in position completely folded over about a transverse hinge.
Figure 3B:
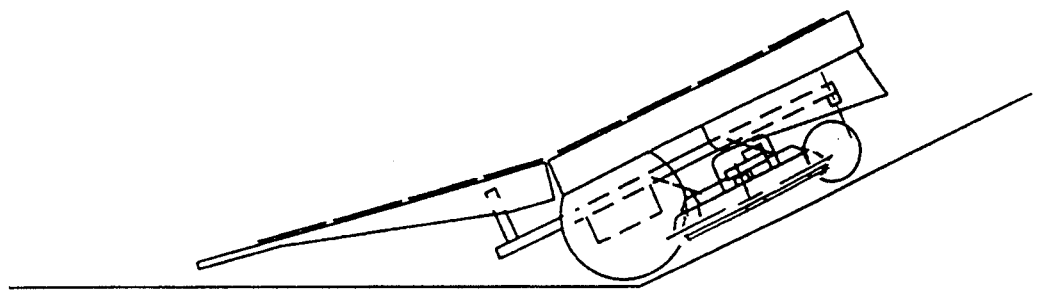
Figure 3C:
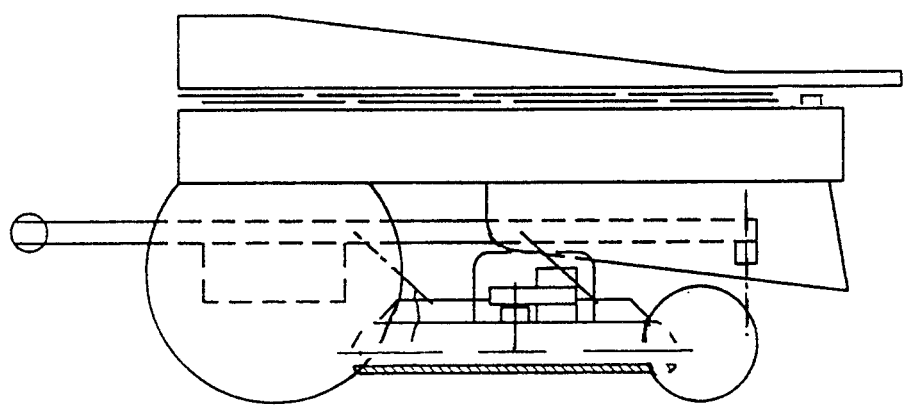

According to FIGS. 1 and 2, a beam chassis 1 supports the electronic operating circuit described in greater detail by the following, the two driving gear motors of the driving wheels 15, a low capacity (e.g. 1 A/h) battery 18 which allows the circuit to be kept on stand-by during absences of light and to even out the current coming from the voltaic cells. The chassis supports a panel 9 covered with photovoltaic cells 10 in juxtaposed mosaic. The chassis 1 furthermore supports supple connectors 2 situated in the axis A–A' of the two driving wheels 15 which allow a relative movement of the panel 9.

According to a particular example of the embodiment 34 cells of 100×100 mm PSC100 H (Kyocera) of 44.2 W (peak) will be utilized.

The supple connectors 2 allow a longitudinal movement of the panel 9 and prevent a transverse movement. The device moves perpendicularly to axis A–A'.

Contacts 3 situated on both sides of the connectors 2 allow the detection of movements of translation and rotation of the panel 9 and, with the help of the control computer 19, to locate the obstacle. The contacts can be replaced by all other electronic movement and position detectors.

Two free wheels 4 are mounted in front and mechanically connected to the beam chassis. The cutting head 5 is suspended between the beam chassis and the two wheels 4.

According to the illustrated embodiment, the cutting head is suspended from two longitudinal girders 6 by means of threaded rods which allow the cutting height to be adjusted.

According to another possibility a connection from the cutting head to the longitudinal girders is provided by means of a couple of tubular parallelograms (7 FIG. 2) of which one single upper longitudinal side rigidly forms one piece with the chassis, the angles forming hinges. A stop is provided which allows the height of the cutting head to be regulated without impeding its forward movement.

The latter device shows the advantage of allowing the cutting head to rise in case of ground irregularities when the device maneuvers in reverse. When moving forward on the other hand the pair of driving wheels lighten the front of the device in case of resistance to advancement which allows the obstacle to be passed easily without necessitating a retraction of the cutting head. A mechanical coupling not shown in the drawing can be provided between the cutting head and the upper panel in such manner to adjust automatically the height of the front guard 17 of the device to the cutting height.

A field detector 8 is mounted at the front of the device.

Alternatively other types of detector, e.g. magnetic, optical etc. can be mounted thereon.

The panel 9 supporting the voltaic cells 10 is attached to the chassis by means of the connectors 2 and of a pivot connector 11 situated at the front.

Figure 4:
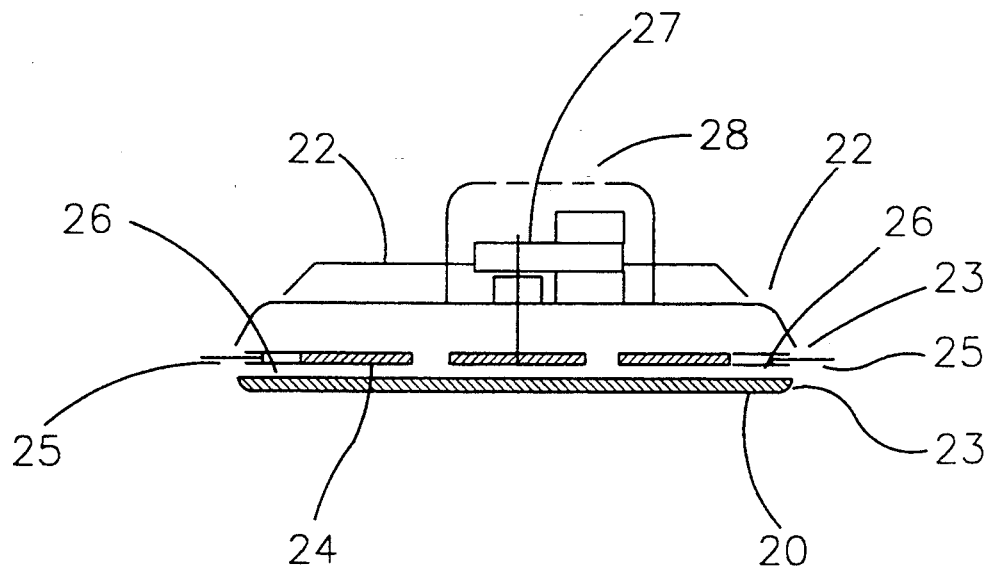
FIG. 4 is another cross-section of the cutting head.
Figure 5B:
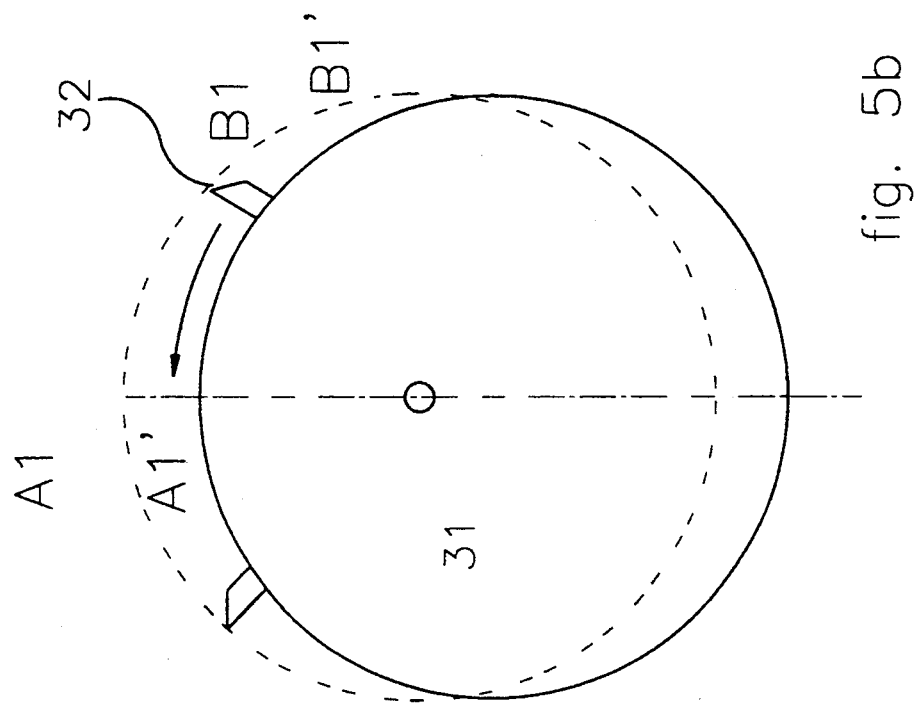
FIGS. 5a and 5b represent top views of two embodiments of the cutting head.
Figure 5A:
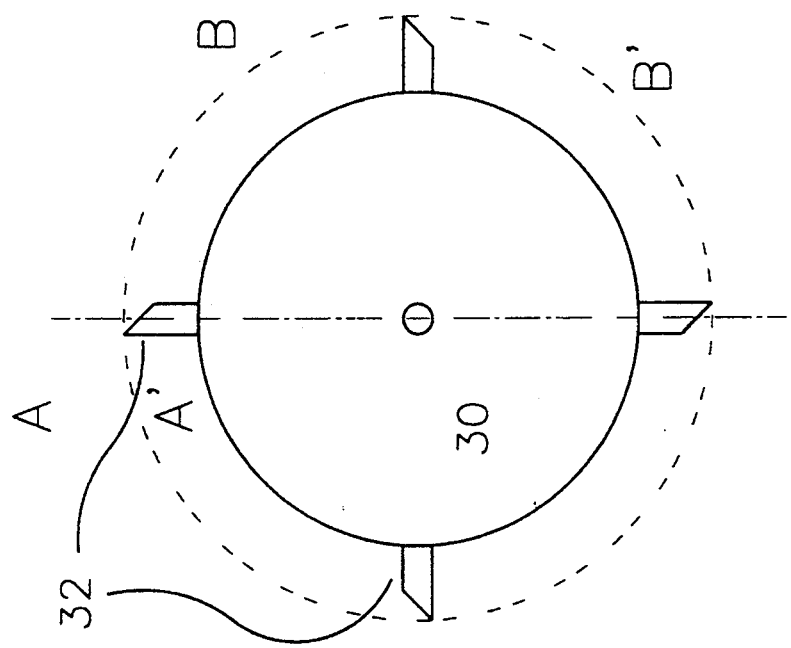
Figure 6:
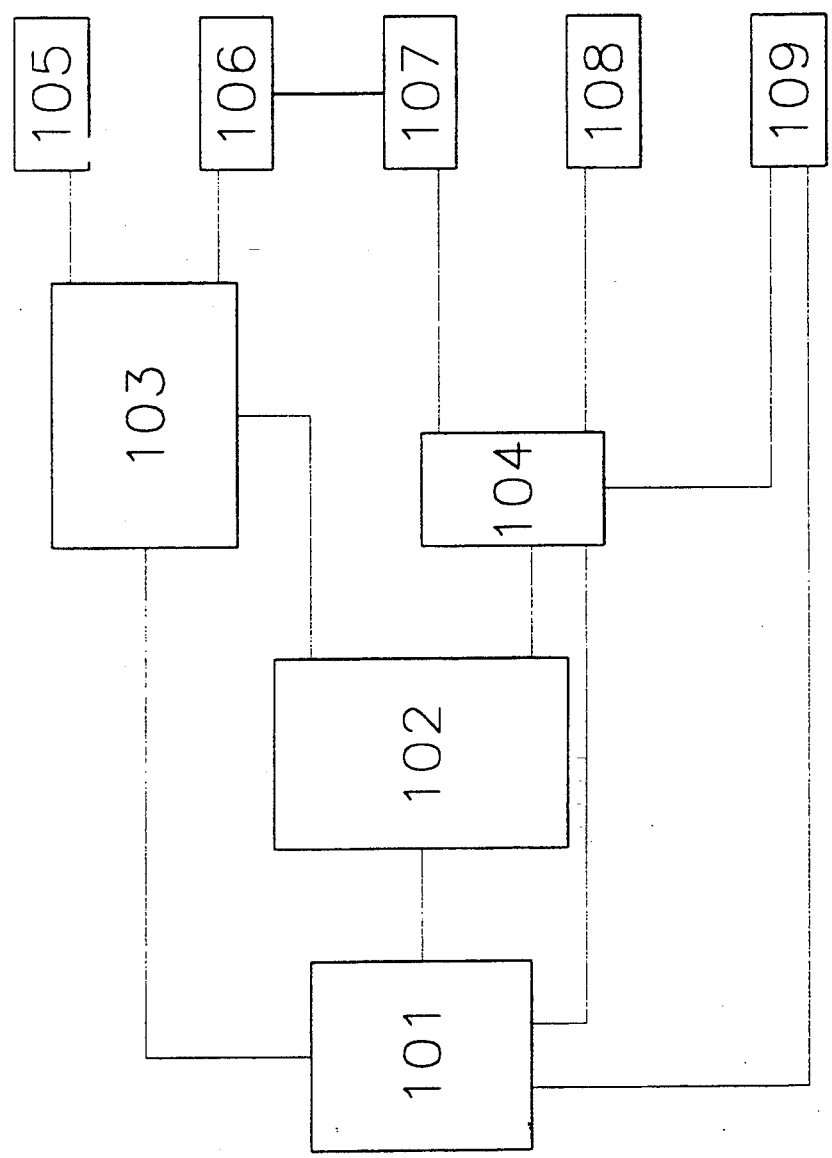
FIG. 6 represents a block diagram showing some elements of the device and their relationship with the electronic control system.

As more fully illustrated in FIGS. 4 to 6, the panel 9 is constructed in two parts articulated around a hinge 12.

The presence of an articulated panel allows several problems to be solved which occur in the practical realization of the device according to the invention.

The articulation of the rear part of the panel gives the possibility of decreasing the height of the device while allowing access to significant slopes and maintaining a sufficient panel surface area and an adequate balancing of the weight on the driving wheels. The proper balancing of the device involves a cantilever load at the rear. When the device undertakes an incline, the rear of the panel articulates around the hinge upon physical contact with the ground, thus allowing the passage of the device.

Moreover, the panel can pivot over 180° and therefore allows the longitudinal. cumbersomeness of the device to be reduced to half, for example for transport in its inactive state.

FIGS. 4 and 5 illustrate the positions of the panel when climbing a slope or, for example during transport, in entirely folded over form, the device at that time being inactive.

A contact 14 is attached to the articulation in such manner so that if the pivoting angle of the panel exceeds a certain value the device stops. The device thus automatically stops in case of turning over by the front or in case of emergency, manually, by raising the rear part.

A stop allowing the horizontal movement of the panel can accessorily be provided in order to decrease the stress on the hinges. The support of the stop 16 can then advantageously be utilized as carrying handle.

A control panel 13 is attached to the rear part of the beam chassis 1 which allows the user to stop the device completely or to introduce data for the control computer (security code, motion parameter).

The driving wheels 15 are individually operated by nominal power gear motors of 2 to 10 Watts and have a conformation which gives them a good adherence in the direction parallel to motion and easy pivoting in the perpendicular direction. For example, their hollow form offers a greatly reduced weight and removes the cantilever load on the output shaft of the gear motor.

The cutting head of the device according to the invention advantageously offers a solution to the research into an optimum efficiency in relation to four types of consumption:
carrying along the grass by the movement of the cutting tool,
air drag by the movement of the cutting tool
friction
actual cutting force Conventional cutting systems effect the grass cutting under the cover, the cut grass being carried along by the system in rotation.

A significant part of the energy utilized during classical mowing with former systems therefore serves to communicate a kinetic energy to the grass which is propelled by the cutting blade.

The device described hereafter, which constitutes a particular mode of the embodiment of the invention, to a large extent eliminates the contact of the grass with the system in rotation.

The cutting head is in fact constituted by a plate 20 connected by flanges 21 to the upper plate 22 the form of which is studied in order to leave only a very small space 23 between the two plates.

A disc 24 preferably comprises at least two retractable blades 25 pivoting around a shaft 26 and capable of returning into the interior of the disc. When the disc commences rotation, driven by the motor 27, the blades move apart by centrifugal force and exit through the space 23 between the two fixed plates 20, 22.

The moving part in contact with the grass is extremely small which considerably limits the carrying along of the grass by the system in rotation.

A circulation of air 28 caused by the rotation of the disc but kept at a minimum due to the shaping of the disc and to the small space between the fixed plates prevents air debris from entering the cutting head and the articulation system of the blades. The friction on the surface to be mowed is eliminated due to the lower disc 20 and that due to grass debris is eliminated due to the circulation of air 28.

The very thin blades 25 allow an efficient cut. A spring system can permit an easy exchange of blade.

The low inertia of the blades, their return into the interior of the disc in case of shock and the very low power of the motor are factors which offer a particularly advantageous utilization safety.

FIGS. 5a and 5b illustrate a particular mode of the embodiment of the cutting head according to the invention which has proved to be particularly advantageous. It has in fact been established that the braking effect by the already cut grass on the cutting disc is minimal when the forward movement of the machine between two successive passes of the blades 32 corresponds to the length of a blade. The relationship between the speed of the machine and the speed of the blades can be established as follows:

$$\text{Machine speed} = N \times l \times n$$

where
N = number of revolutions per second
l = active length of the blade
n = number of blades This is nevertheless only true in the axis of the machine as indicated in FIG. 5a representing a classic configuration. A blade of grass cut in A will be under the plate 30 in A' at the time of the passing of the next cutting blade. On the other hand the blade of grass cut in B will many times be in the trajectory of the cutters before arriving in B' thus causing a useless braking on the cutters through contact without significant cutting.

According to the above mentioned particular mode more particularly illustrated in FIG. 5b, lower and upper circular plates 31 of dimension equal to the surface covered by the extended blades of which the center is offset toward the rear by a distance equal to the useful length of the cutters are utilized. The distance during which a blade of grass is subject to a contact with the cutting blades becomes constant whatever its position in relation to the axis of the machine.

In the scope of the present invention, the optimization of the energy available such as realized with the above mentioned mode of the embodiment of the cutting head shows a significant advantage.

The cutting head is preferably operated by a direct current motor without electronic commutator brush. This choice is dictated by the requirements of life constraints and efficiency which the operating principle of the device implies. According to one embodiment, a SEL Alcatel motor type BG29 of 15 W nominal at 12 V is particularly suitable.

The operation of the motor with electronic commutator can nevertheless cause very sudden magnetic field variations which are difficult to eliminate. This can disturb the operation of the limit detector (8) described above.

Figure 13:
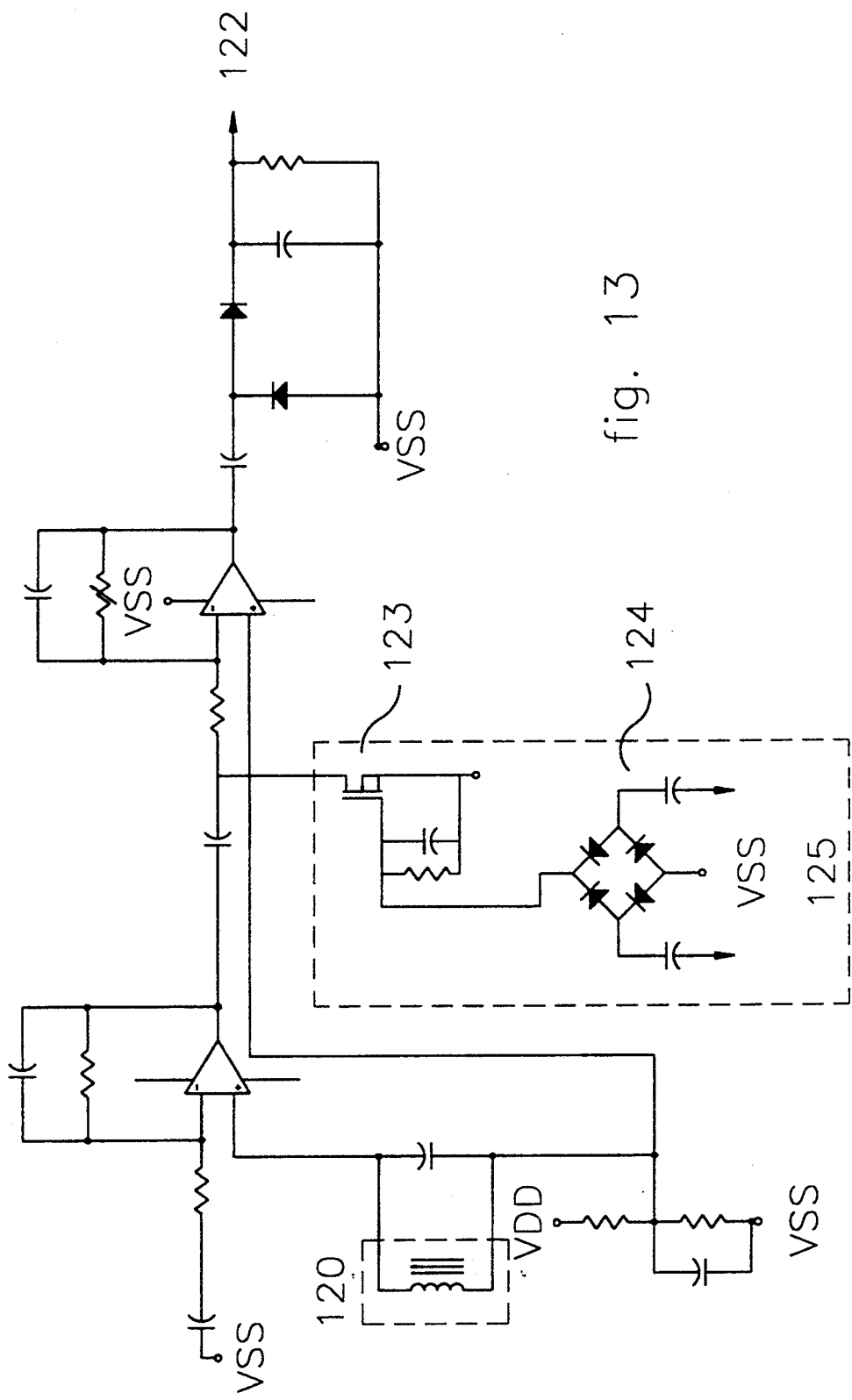

A circuit (FIG. 13) advantageously allows the effect of the disturbances associated with this type of operation to be eliminated. For this purpose a detector 120, a noise supply circuit 121, a connection to the controller 122, a transistor 123 T1 capacitors 124 (C2 and C2) and connections to the cutting motor power supply are provided.

The signal emanating from the motor controller is relayed at the entry of a differentiating circuit c1 c2 and rectified in such manner to obtain a positive impulse at each commutation of the motor. These impulses act on a transistor T1 which cuts the signal coming from the detector during the commutation of the motor. This allows the signal-noise ratio to be improved typically by a factor of 10.

As indicated in FIG. 6, the control of the mowing device is effected with the assistance of an electronic circuit control comprising a micro-controller 102 with the mowing device management program in memory. Furthermore are illustrated an energy control device in 103, control of the motors in 104, photovoltaic cells in 105 and a battery in 106.

The micro-controller receives a series of environmental information (101) e.g.
  voltage at the photovoltaic cell terminals
  speed of each wheel
  current in the cutting head or rotation speed
  current generated by the photovoltaic cells
  recording of an exterior shock
  level of the electric field placed at the front of the device
  humidity detector
and from there computes a series of parameters:
  sunshine: by the measurement of the current and of the voltage at the cell terminals combined with the known photovoltaic cell characteristics.
  slopes or obstacles: by the measurement of the wheel speeds in relation to the power supplied.
  grass height: by the analysis of the current absorbed by the cutting head and of the forward speed.
  distance in relation to the limits of the plot of land determined by a wire with alternating current flowing through it or by a metallic mass (chain for example) and obtained by the analysis of the signal measured at the terminals of the detector 8.
  shaded zone by the analysis of the variation of sunshine over a fixed distance covered.
  state of the ground: by the analysis of water projections on a contact mounted on the chassis.

The micro-controller sends its instructions to the energy management unit and to the control circuits 104 which act on the three motors 107 108 109 causing the device to operate.

Figure 7A:
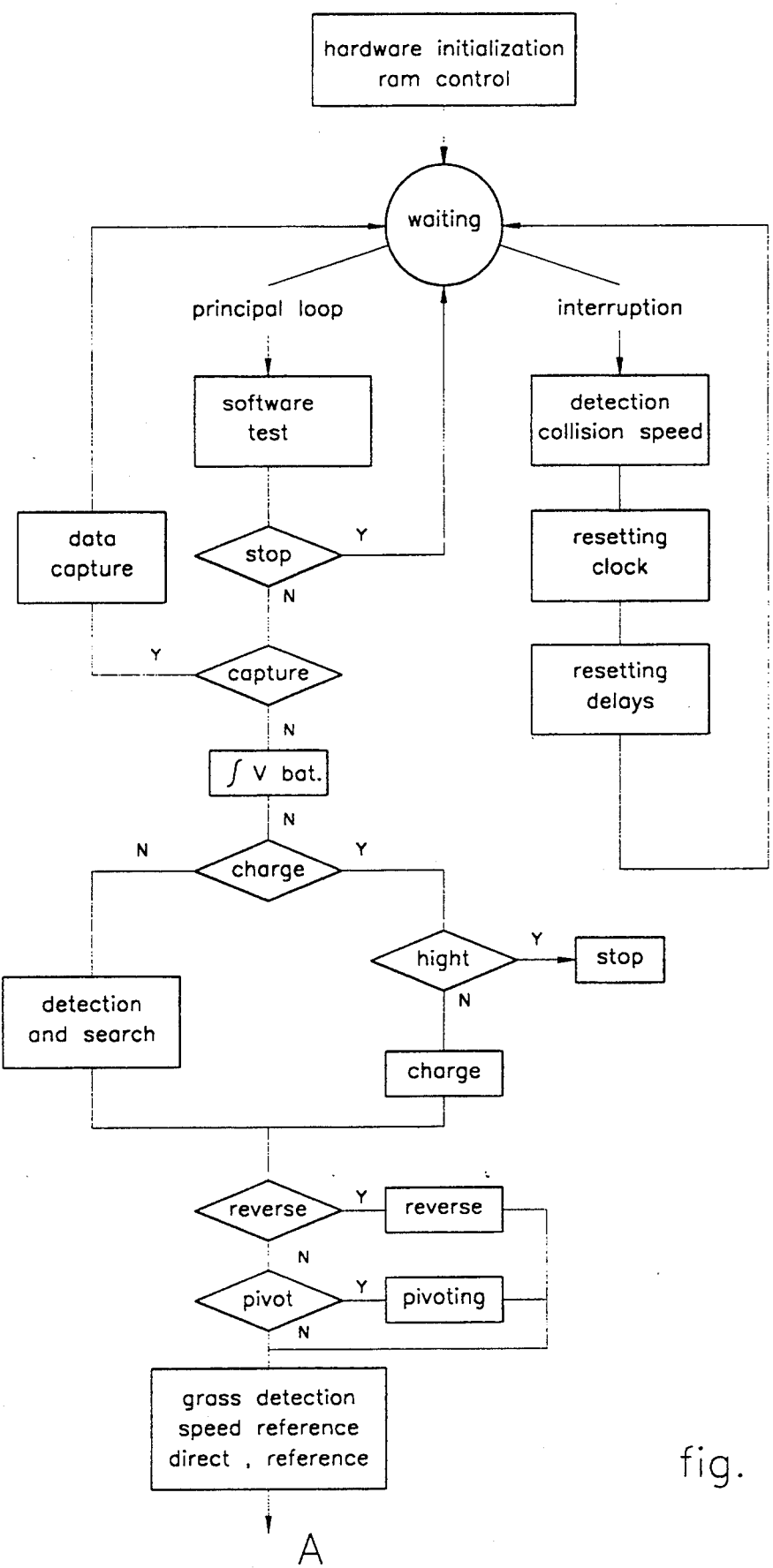
FIGS. 7a and 7b represents a simplified block diagram of the control program.
Figure 7B:
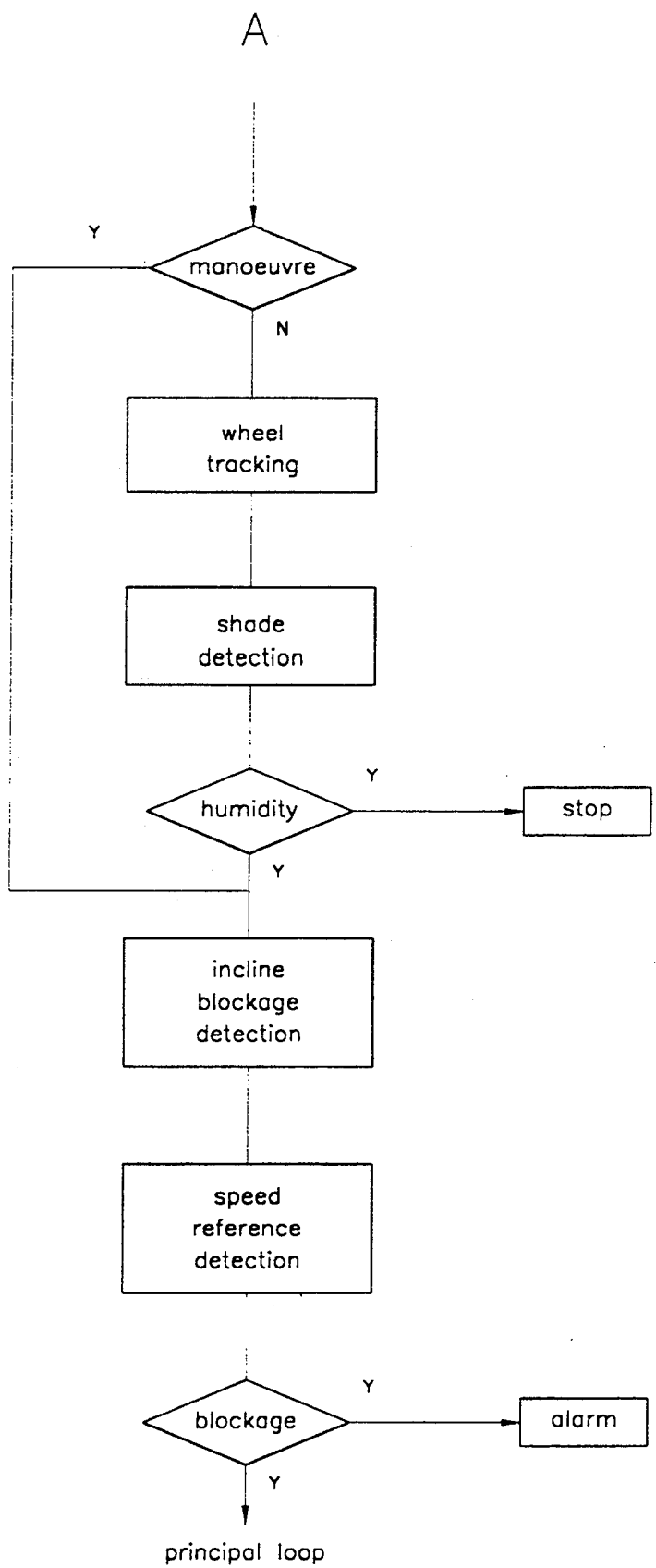

An example of control program is illustrated in FIG. 7a and 7b by means of a block diagram.

Two principal loops direct the operation of the program:
  a loop activated by an interruption signal generated every 4 milliseconds by the microprocessor hardware. This loop allows the 2 driving wheel speedometers to be incremented separately, to check the 'watchdog' to analyze the collision detectors and to update the clocks and delays which have to be utilized by the principal loop.
  a principal loop which activates the environmental data acquisition every 100 milliseconds and which in function of the analysis of the exterior parameters controls the operations to be effected by the device in its difference states:
    cutting function
    maneuver (reverse, pivoting)
    stoppage on account of too weak luminosity
    stoppage on account of too wet grass
    stoppage on account of recharging
    alarm (incident, wheel blockage).

The invention will be better understood with the assistance of the additional description of the principal operating modes which follow.

Many guiding systems can be adopted. A guidance based on the analysis of the cutting force has proved to be particularly advantageous.

The force supplied by the cutting head is constantly measured and transmits to the control system an indication of the density and the height of the grass to be cut. The micro-controller adjusts the speed of the device so as to maintain an optimal speed. When the cutting resistance is too weak (zone already cut) the controller transfers a maximum of energy to the driving wheels in such manner to move quickly to a zone still to be mowed. The speed can vary for example from 1 to 5 km/h.

Figure 8:
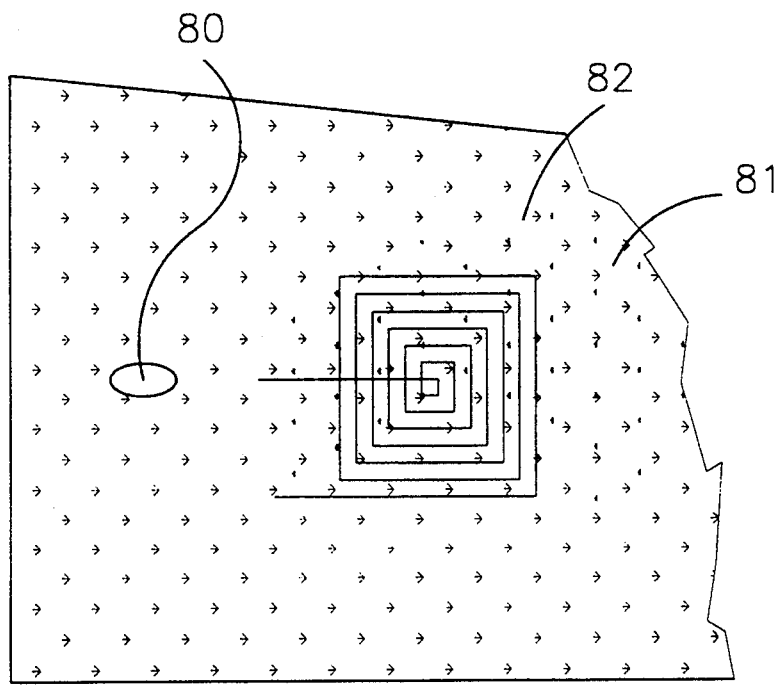
FIGS. 8 to 11 illustrate the cutting algorithms which can be applied.

As illustrated in FIG. 8, when the control system detects an unmowed zone 81 of the surface to be mowed 82, the device 80 according to the invention penetrates into it by a specific distance x and describes a spiral in such manner as to remain as long as possible in the zone showing a high resistance to cutting (significant height and density of the grass). When it has run a predefined distance there without encountering further resistance the device sets off again in a straight line transferring a maximum of energy to the driving wheels until a new less mowed zone is encountered.

Figure 9:
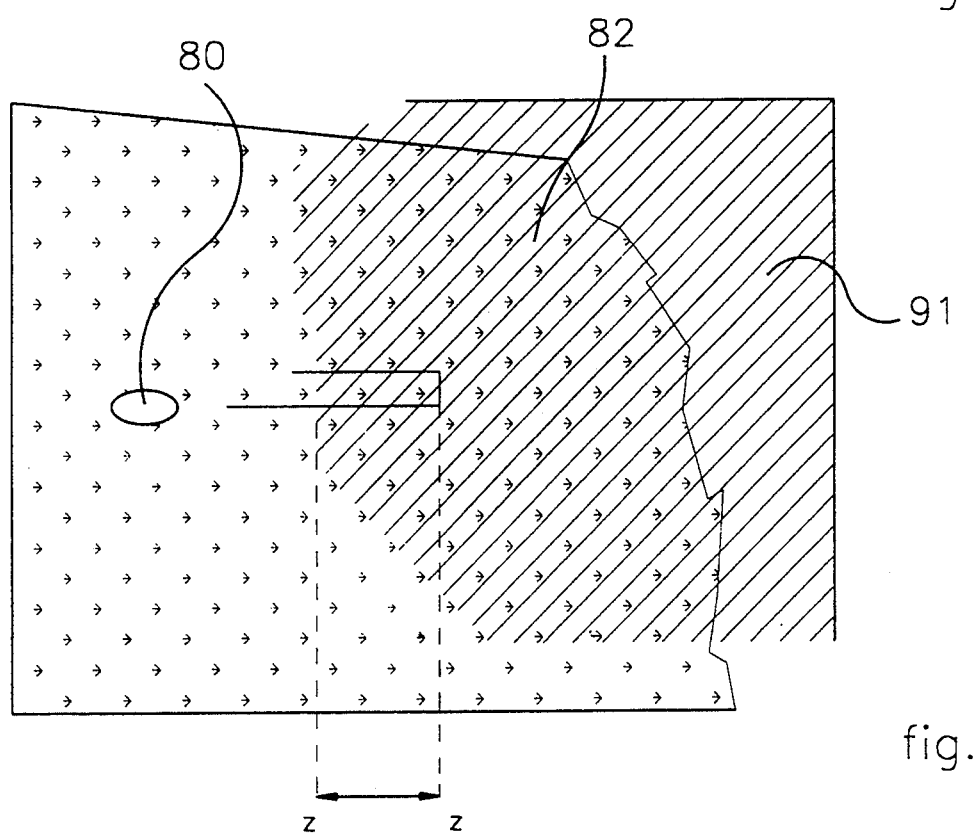

According to a particular mode of the invention, a shade detection system 91 (FIG. 9) is provided.

The object of the shade detection system is to avoid that the device remains a long time in a shaded zone. With the shade constantly moving during the day, according to the relative position of the sun, it is possible to mow almost the whole of a lawn surface 82 while remaining exposed to the sun, if it is present. The few zones constantly in the shade are covered either during the cloudy interval which eliminates the contrast in luminosity due to the presence of shade or by temporary intrusions into the shaded zones during normal operation.

The control system, with the objective of detecting shadows, effects an evaluation of the energy received by the photovoltaic cells at intervals corresponding to a fixed distance covered by the device, distance equal to the width of one cell. It continually compares the energy received to that received during the preceding interval. The passing of one row of cells from sun to shade causes the recording of a fall in energy. If this fall exceeds a predetermined value, it is considered as a signal of entry into shaded zone. The device then continues its movement over a distance $zz'$ in order to verify whether the shaded zone is not accidental. If the energy received remains at its reduced level, the device turns back to return to the sunny zone.

Figure 10:
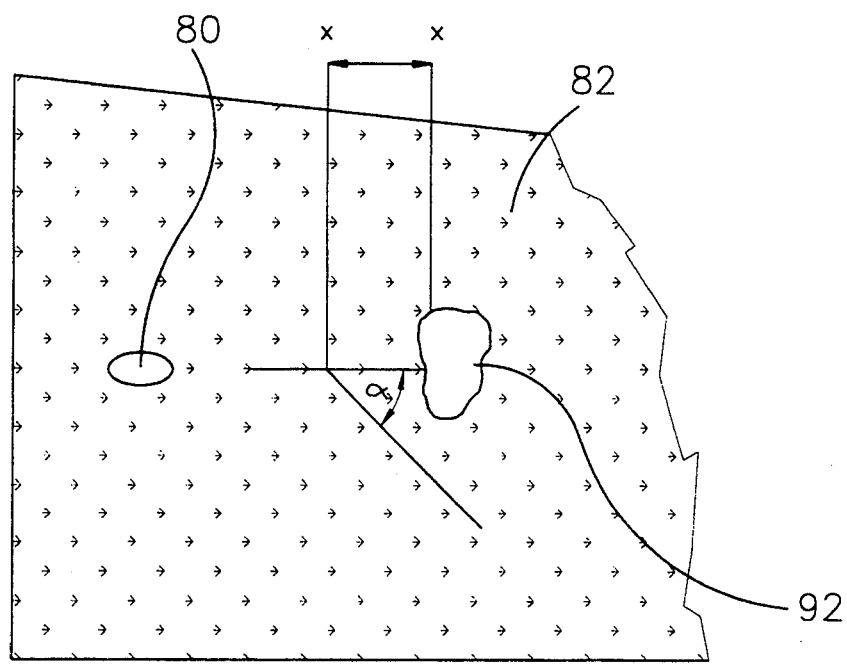

According to another aspect of the invention an obstacle detection system 92 (FIG. 10) is provided.

The system constantly analyzes the relative movement of the upper panel in relation to the chassis. When a movement is recorded by means of the contacts 3 and/or other detectors of equivalent function, the system reacts by stopping the device and by making it effect an avoiding maneuver defined by the control program.

According to a particular mode of the embodiment of the invention, the device stops, reverses by a distance of xx and pivots at an angle alpha before setting off again.

According to another mode, the device pivots in the direction opposite the shock which allows it to verify the free space around the obstacle. If the space is greater than the width of the device, the device sets off again if not it considers it has encountered a continuous obstacle, e.g. a natural limit of the surface to be mowed, reverses and turns back.

According to another aspect of the invention a slope and ground irregularity detection system is provided.

The system constantly analyzes the relationship between the energy supplied to the 2 driving wheels and their speeds in order from there to compute the resistance to advancement.

The combination of this parameter and the data from the control program allows a wheel blockage to be identified, for example, and to effect a series of disengaging maneuvers (change of direction, pivoting . . . ).

It also allows a significant slope to be identified in which case the program makes the device pivot at a predefined angle in order to approach the slope obliquely which decreases the energy requirement and allows the wheel motors to be utilized with a power and a weight compatible with the principle of direct solar power supply.

Figure 11:
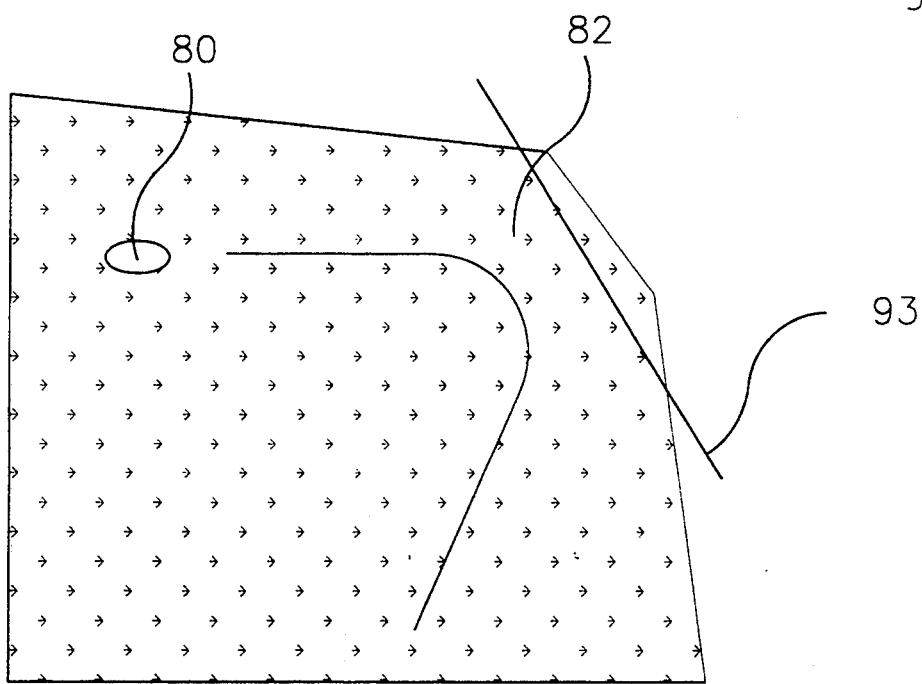

According to another aspect of the invention, illustrated in FIG. 11, a surface limit detection system in the absence of natural limits forming an obstacle, is provided. When the limits of the surface to be mowed are not defined by natural obstacles such as barriers, fences, borders, posts (contact studs), etc. a wire 93 with alternating current (e.g. 5 KHz) flowing through it of low amplitude (a few mA) can be utilized which is placed on the ground along the desired limits. This technique is well known for guiding autonomous devices. The electric power supply can itself come from fixed photovoltaic cells, e.g. at the extremities of a wire or wires, the original direct current being transformed into an alternating current of desired frequency.

Alternatively, a more reliable passive system since independent of all power supply system and not being able to be taken out of service by an accidental severing of the wire.

It might be for example a metallic chain placed on the ground. The front sensor will enable the detection of the metallic mass by a modification of its inductance.

In all cases the system reacts as soon as it approaches a limit by analyzing the sensor signal and by calculating the distance which separates the device from the limit. When this distance becomes less than a preprogrammed distance, the device pivots until the distance becomes greater than that programmed.

If the fact of pivoting in one direction brings the device nearer to the limit instead of moving it away from it, the control system automatically changes the pivoting direction. If for one reason or another the device comes too close to the limit, the control system starts up the collision procedure such as described above (reverse followed by pivoting).

According to yet another aspect of the invention an energy management system is provided.

The energy management unit operated by the microcontroller has two functions: management of the state of charge of the backup battery, detection of the nocturnal period and placing the system in waiting state with minimum consumption.

The battery is provided in order to allow the operation of the electronics in the darkness by maintaining certain circuits constantly switched on. It also allows the operation of the mower in shaded zones or during cloudy intervals and evens out the photovoltaic energy supplied during diurnal operation and must therefore be kept sufficiently charged.

The control system constantly verifies the voltage at the battery terminals and effects an arithmetic mean over a given period. If the mean voltage decreases below a programmed critical value, the control system verifies that the device is not in a shaded zone as described above. If this is not the case, the device is stopped and waits until the voltage increases to an acceptable value.

If a shaded zone has been detected, the device finishes the shade leaving routine before stopping.

When night falls, the current coming from the photovoltaic cells decreases, finishes by fading out and even becomes negative through discharge of the battery through the photovoltaic diodes.

In order to avoid this phenomenon an external diode can be provided in series with the cell battery which prevents the current from reversing.

The diode unfortunately involves a drop in voltage which decreases the efficiency of the unit.

Figure 12:
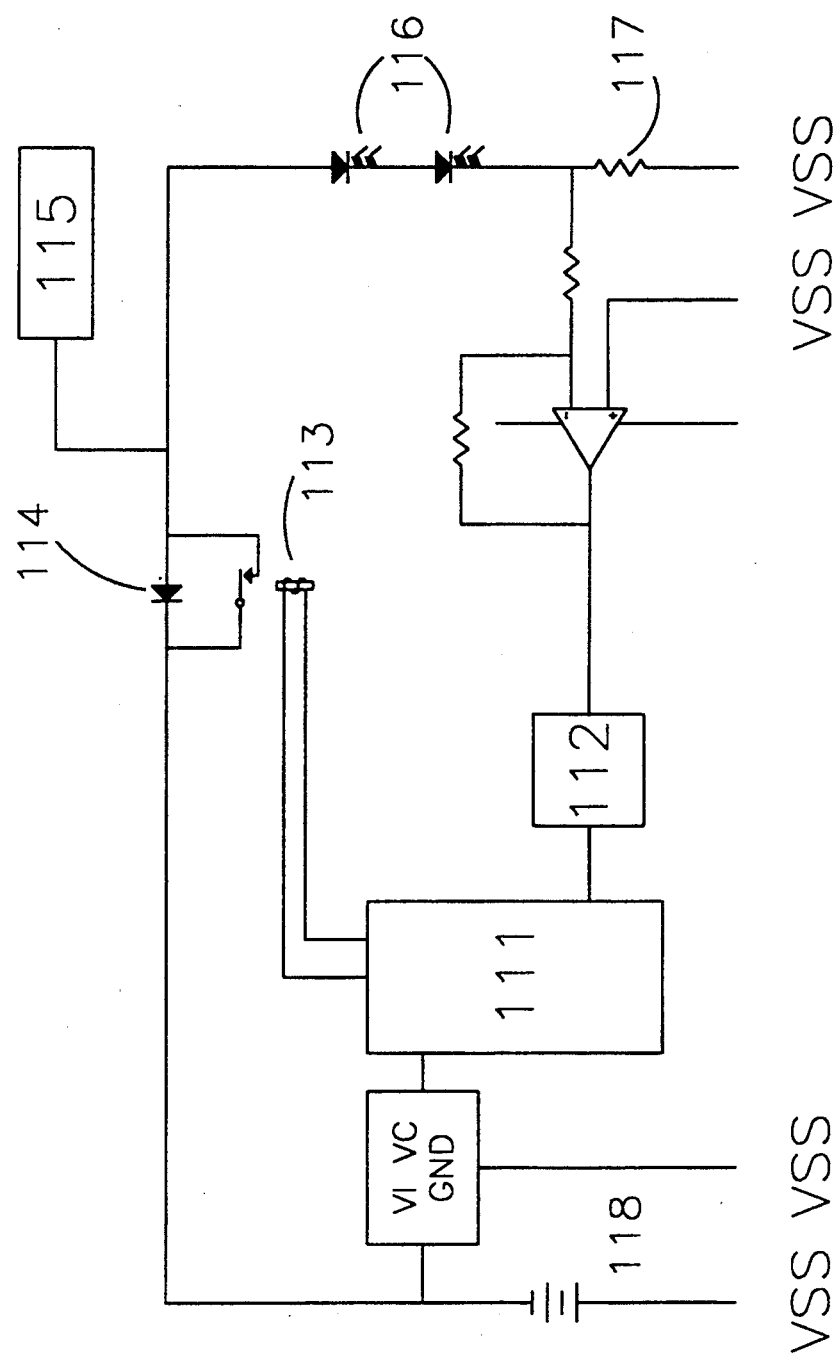
FIGS. 12 and 13 illustrate examples of electronic circuits which can be applied respectively to prevent the batteries from discharging in state of waiting and magnetic disturbances at the level of a limit detector; e.g. a field detector, while the motor is operating.

According to one aspect of the present invention, the drop in voltage in the diode is eliminated by short-circuiting this during normal (diurnal) operation by means of a switch (relay or transistor) operated by the microcontroller. FIG. 12 thus illustrates this aspect by representing a controller 111, an analog/digital converter 112, a contact 113, a diode 114, a motor control unit 115, voltaic cells 116, a current measuring shunt 117 and a battery 118.

This constantly measures the current coming from the photovoltaic cells and when it detects zero measure of flow, it automatically cuts the switch separating the cells and the battery circuit power elements. It also puts the device into state of waiting.

The diode in parallel on the switch allows the current to become positive again when the voltage from the cells again exceeds the battery voltage increased by the fall of voltage in the diode. The device is then restarted and the micro-controller then reestablishes the contact.

The device is also preferably provided with a humidity detector in itself known. Above a certain humidity threshold, the mower is put into state of waiting. If the degree of humidity decreases below a certain reference value, the operation of the device restarts to the degree in which the other parameters permit. This allows the operation of the device to be avoided in the rain or on a too humid lawn, operation which would not be very efficient and could lead to blockages (mud, puddles etc . . . ).

The device guiding system can follow different algorithms and is not limited to that which has been described above. Each of the above identified device guiding systems may be used independently or in combination with any or all of he other guiding systems.

According to the invention, it is in fact possible to adopt a 'mapping' system allowing the device to memorize the limits of the surface to be mowed, the zones already mowed and for each surface unit previously mowed the cutting force on the aforesaid unit. This allows the device subsequently to optimize the mowing route by repassing more often over the zones where the grass grows more rapidly.

For each surface unit the 'mapping' assigns a memory point with a parameter 'cutting force-limit obstacle' which enables it to prepare a map of the surface to be covered. The device can find its way around by obtaining a previous working knowledge of the obstacles on the plot of land. This technique is in itself known. Knowledge of the speed of each driving wheel in fact tells it the distance and the direction. Positioning or repositioning systems can also be devised by precise and periodic localization of generators (optical, ultrasonic or high frequency e.g.) disposed on the plot of land.

As an illustration the following solutions have been provided to the problem of constructing a sufficiently rigid, light upper panel which gives efficient protection to the photovoltaic cells.

Figure 14:
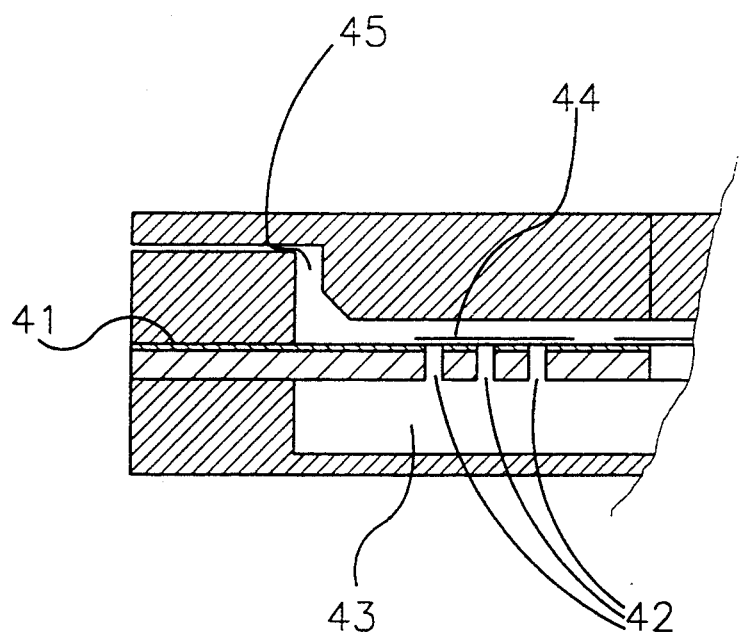
FIG. 14 illustrates the arrangement of the cells.

As described in FIG. 14, the cells are arranged on a sheet in elastic material 41 at the bottom of a mold. The mold and the elastic sheet are pierced with holes 42 placed under the cells. A cavity 43 is created under the mold pressing the cells 44 against the elastic sheet. The cells are electrically connected to each other and the molding product (rigid polyurethane foam) is injected into the mold 45 embedding the cells in the resin. After hardening and stripping, the exterior side of the panel, preferably prepared slightly convex, is protected by a transparent plastic membrane which protects the cells for all exterior attack, notably the effects of rain.

The invention is not limited to the particular mode of the aforesaid embodiment and may vary in its construction and details.

I claim:

1. Autonomous lawn mower, with electric motors, comprising at least one driving wheel, a cutting system, an electronic operating and control system for operating and controlling said electric motors associated with said at least one driving wheel and said cutting system, a rechargeable battery and/or photovoltaic cells to supply energy for said electric motors and for said operating and control system, the total power utilized by said motors being less than 120 Watts and a microprocessor and means for detecting obstacles on, and/or limits of, a lawn surface being provided, said detecting means supplying relevant environmental information to said microprocessor; an algorithm stored in the memory of the microprocessor, the electronic operating and control system operating the lawn mower according to the responses to obstacles on, and/or limits of, the aforesaid surface supplied by the detector means and the algorithm, the algorithm maintaining the mower continuously either in operation, or in state of waiting for sunshine or recharging the rechargeable battery, the operation depending upon the state of charge of the rechargeable battery and/or the sunshine.

2. Autonomous lawn mower, according to claim 1, further comprising at least a means of detecting grass surfaces to be cut by measurement of the energy absorbed by the cutting system.

3. Autonomous lawn mower according to claim 1 comprising one rechargeable battery.

4. Mower according to claim 3, wherein the capacity of the rechargeable battery is less than 2 amps/hr.

5. Mower according to claim 3, wherein the weight of the rechargeable battery is less than 5 kgs.

6. Mower according to claim 3, wherein the weight of the rechargeable battery is less than 1 kg.

7. Mower according to claim 1 wherein the rechargeable battery is powered by photovoltaic cells.

8. Mower according to claim 1, wherein the rechargeable battery is powered by a power source present or in the proximity to the surface to be mowed, the mower automatically and periodically moving there according to a determined algorithm depending upon the state of charge of the aforesaid battery.

9. Mower according to claim 1, wherein all movement and all mowing operations are interrupted by the electronic operating and control system when the state of charge of the battery or the sunshine is less than a reference value, the device then being in a state of waiting or in a recharging mode.

10. Mower according to claim 1, further comprising at least two driving wheels and having an independent motor connected to each driving wheel.

11. Mower according to claim 1, wherein the obstacles are detected and skirted by analysis of the relative movements of an upper plate, and a lower chassis.

12. Mower according to claim 1, wherein the limit detector is a field detector at the front of a chassis which allows the detection of the limits of the zone to be mowed determined by one or more cables buried or lying on the lawn, said cables being supplied with a low current.

13. Mower according to claim 1, further comprising an algorithm for avoiding shaded zones through the analysis of the variation in sunshine for a determined distance run.

14. Mower according to claim 1, further comprising a humidity detector which provokes the device to stop and start according to the degree of humidity.

15. Operating system of an autonomous electric mower according to claim 1, wherein the search for grass surfaces to be cut is effected by the interaction of the microprocessor, the electronic operating and control system and of a detector of the energy absorbed by the cutting system.

16. Method for mowing a lawn, wherein the mower according to claim 1 is positioned and left in an autonomous manner for at least several days.

17. Method for keeping a lawn mowed, wherein the mower according to claim 1 is positioned and left in an autonomous manner for at least several days.

18. Mower according to claim 1, wherein the total power utilized by said motor ranges between 10 and 60 watts.

19. Autonomous lawn mower according to claim 1 further comprising a speed detector on each driving wheel.

20. Method for cutting grass on the surface of a lawn employing the autonomous mower of claim 1, comprising the steps of positioning the mower on the lawn, the mower detecting the relevant environmental information, and the electronic operating and control system of the mower activating the driving wheel and the cutting system.

* * * * *